Aug. 23, 1960
L. F. THIRY
2,950,102
RESILIENT OSCILLATORY DEVICE
Filed Jan. 4, 1957
4 Sheets-Sheet 1
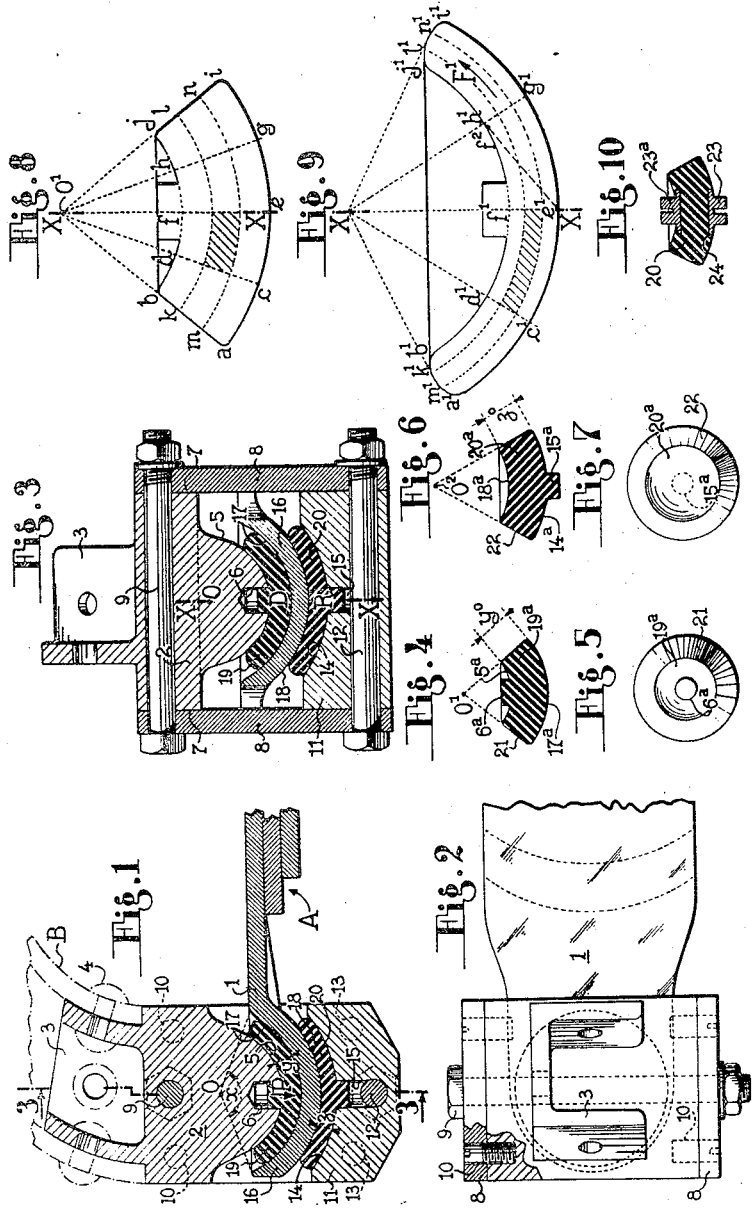
INVENTOR
LEON F. THIRY
BY *Fay & Fay*
ATTORNEYS Aug. 23, 1960 L. F. THIRY 2,950,102
RESILIENT OSCILLATORY DEVICE
Filed Jan. 4, 1957 4 Sheets-Sheet 2
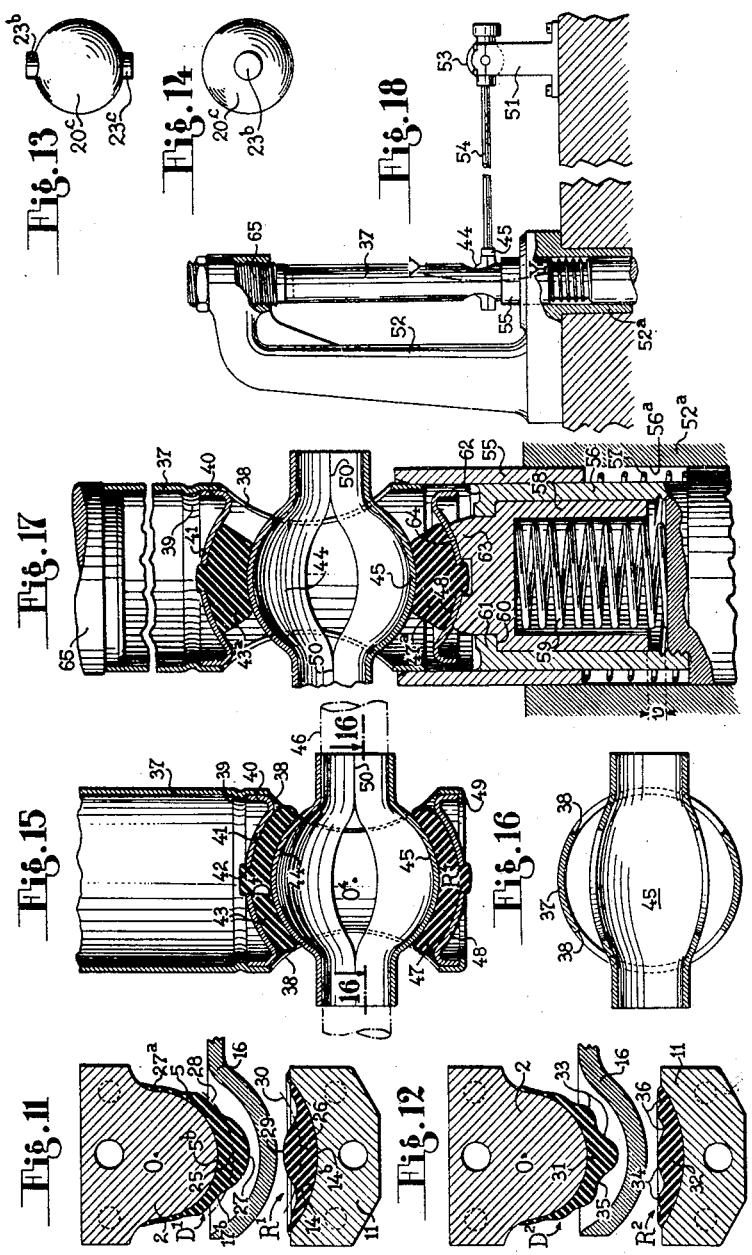
INVENTOR
LEON F. THIRY
BY Fay & Fay
ATTORNEYS

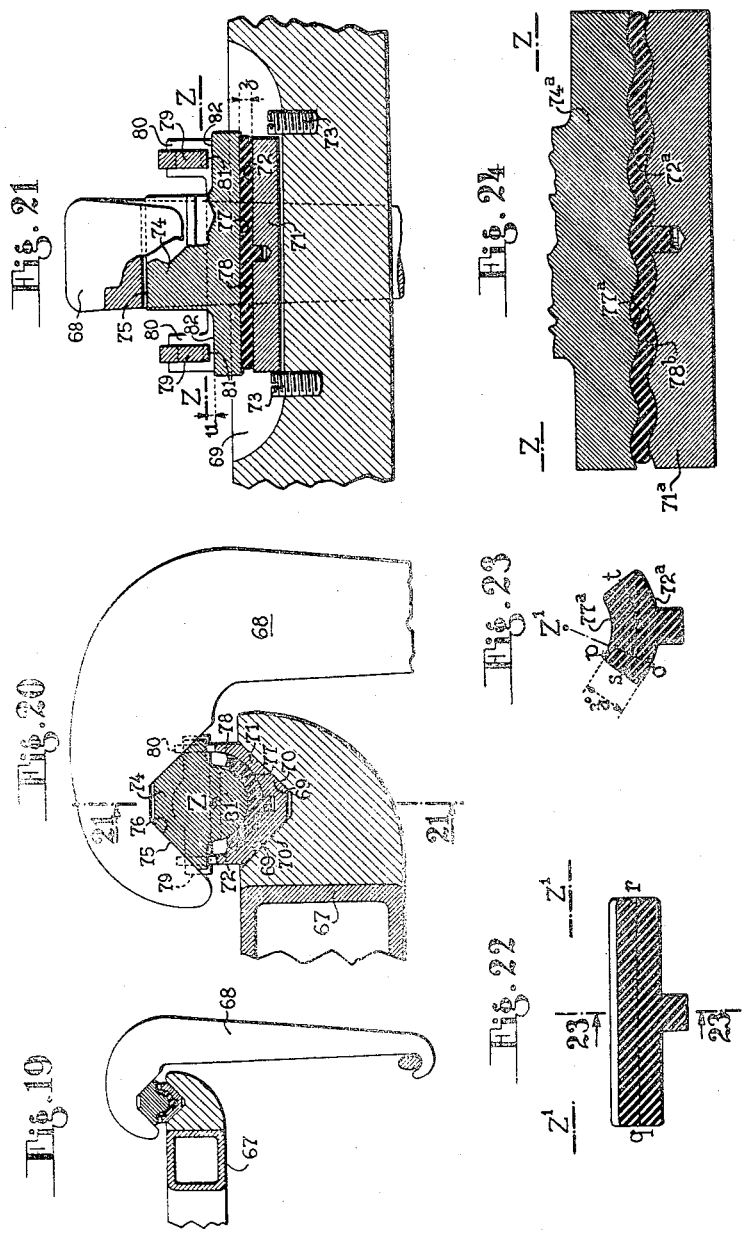

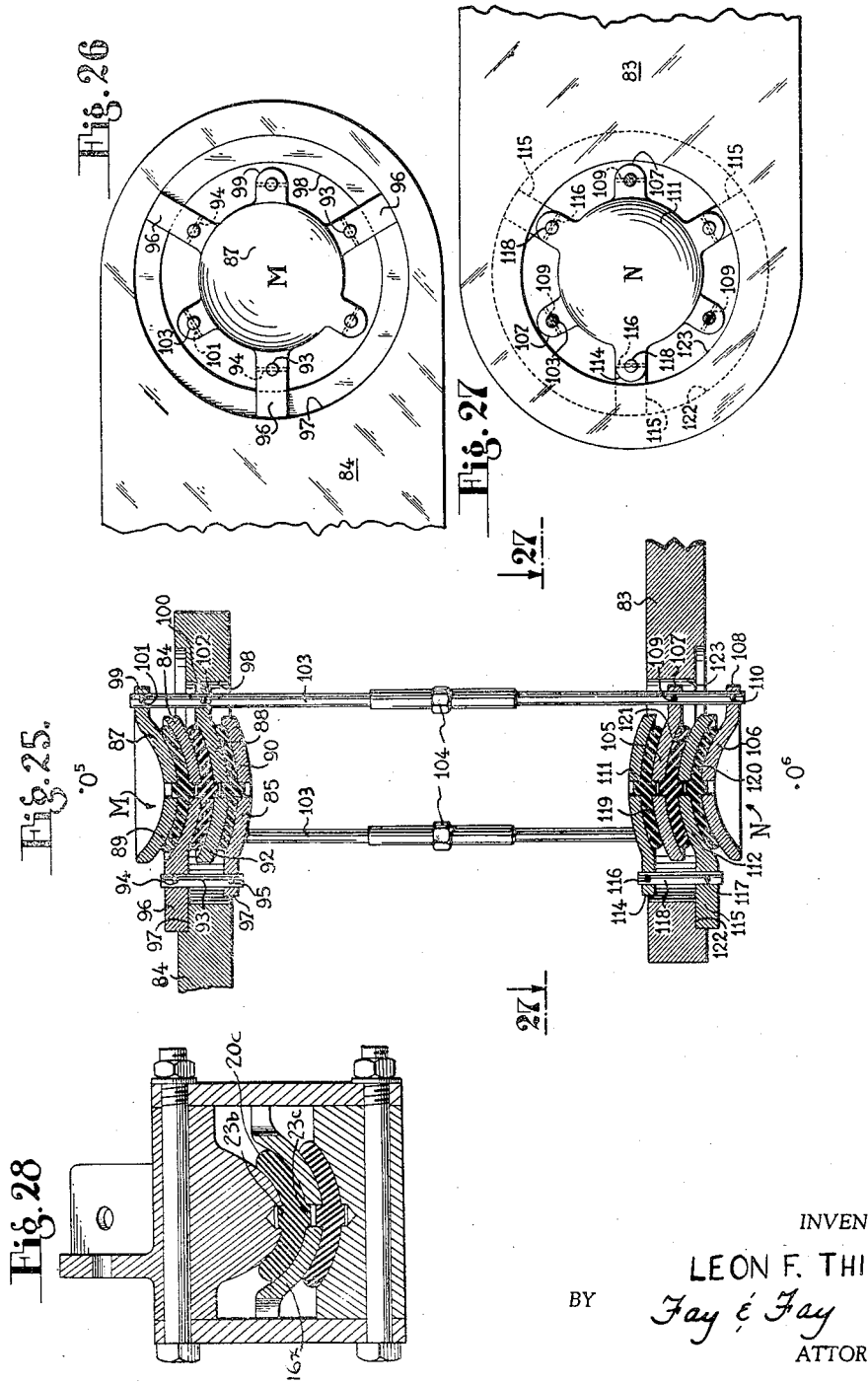

United States Patent Office

2,950,102
Patented Aug. 23, 1960

2,950,102

RESILIENT OSCILLATORY DEVICE

Leon F. Thiry, 104 S. Franklin St., Chagrin Falls, Ohio

Filed Jan. 4, 1957, Ser. No. 632,555

Claims priority, application France Jan. 5, 1956

9 Claims. (Cl. 267—54)

The present invention is directed to the provision of an improved elastic articulation and abutment device for resiliently interconnecting two parts of a machine or other device, and adapted to allow controlled resilient oscillation, although it will be understood that there may be considerable relative movement, of one of the parts with respect to the other around a center or an axis, without the possibility of noticeable closing between these parts which are normally submitted to a force, of gravity or other, which tends to close them, the line of action of such force passing approximately through the center or through the axis of the device so that the device may at the same time constitute an abutment.

This device, of simple, practical and inexpensive construction, is especially remarkable by the fact that it comprises in combination at least a pair of interconnected rigid parts provided with two surfaces which are nearly concentric, one convex male and one concave female surface, the concave surface having an arc or angle not larger than 180°, and an elastomeric element compressed in the direction of its thickness between these surfaces, said elastomeric element being connected, by at least one portion of one of these two contact faces, with one of said surfaces and this elastomeric element presenting, in the deformed state and over a notable portion of its length or surface, a reduced thickness in relation to its free state thickness as a result of tangential spreading between and parallel to these surfaces.

The surfaces of bearing or revolution can have the form of a spherical saucer, dish or cup, or segment of cylindrical surfaces, frusto-conical or similar, having approximately the same axis.

Under one method of accomplishing the device, the interposed or inserted elastomeric element has, in its free state, a substantially uniform thickness over all its length, its two faces being parallel, plane or concentric, and, in the deformed state, has its thickness uniformly diminished when it is spread parallel to its faces, in such a way that all the fibers perpendicular to these faces, in the free state, are shortened the same amount, whereas all the fibers parallel to said faces are elongated the same amount, said elastomeric element being integral with one or two surfaces between which it is deformed by a small portion of one of the two faces.

Preferably, this portion is central and constituted by a lug which is part of the element and is engaged in one of the concentric surfaces which is adjacent to the same.

Under another form of the invention, the elastomeric element, attached by at least one of its faces to the adjacent concentric surfaces, comprises, in the free state, on each of its faces, at least a thicker or bulged part surrounded by a depression and, in the deformed state, the thickness of this elastomeric element is constant due to the levelling of the undulated face by shortening of the radial fiber of the bulged area from which the material in excess fills the depression surrounding said bulge.

Under another form of the invention, the inserted element is of spherical or similar form in the free state and is attached, when assembled, by its diametrically opposed poles, to the two surfaces between which it is compressed and spread.

According to another characteristic of the invention, there is provided, in order to keep the cushion compressed, an antagonistic (counteracting) device preventing the relaxation of the elastic mass if the pressure on the abutment disappears or becomes too small.

The invention has also for its object various applications of the articulation and abutment device above.

Other characteristics will follow from the specification which follows.

In the annexed drawing, given only as an example:

Fig. 1 is the vertical section of an articulation and abutment device according to the invention, applied to the articulation of the main leaf of a spring to the girder of a chassis of an automotive vehicle;

Fig. 2 is a corresponding plan view, with partial cutting;

Fig. 3 is a vertical cross-sectional cut along line 3—3 of Fig. 1;

Fig. 4 represents, in the free state, before deformation, the elastomeric element in the shape of a cushion of the articulation and abutment device;

Fig. 5 is a plan view;

Figs. 6 and 7 are similar views of the cushion of the antagonistic device;

Fig. 8 represents, on a larger scale, a cut of the cushion of the articulation and abutment device, before deformation, and on the section are represented a certain number of imaginary lines, theoretically, of fiber;

Fig. 9 is a similar section, after deformation, and shows what the imaginary lines of Fig. 8 have become;

Fig. 10 represents, before deformation, another variation of the cushion and shows another method of anchoring this cushion in relation to one of the two concentric surfaces between which it will be deformed;

Fig. 11 represents, before assembly, a variation of the device under the invention;

Fig. 12 is a similar view of another variation;

Figs. 13 and 14 are views respectively in elevation and in plan, and in the free state, of another variation of the elastomeric element;

Fig. 15 represents one application of the invention to connect a ball joint to the body of a shock absorber;

Fig. 16 is a cut along the line 16—16 of Fig. 15;

Fig. 17 represents, schematically, the assembly of Fig. 15 and the tools used during assembly;

Fig. 18 is a schematic view in elevation, with partial sectionalizing, of a machine used for realizing this assembly;

Fig. 19 represents, on a smaller scale and in transverse section, the application of the invention to the articulation of the pendular system of a buggy on the girder of this buggy;

Fig. 20 is a vertical transverse cut of the articulation and abutment device of this application;

Fig. 21 is a longitudinal cut through line 21—21 of Fig. 20;

Fig. 22 shows, in elevation and before deformation, the elastomeric element used for this application;

Fig. 23 is a transverse section along the line 23—23 of Fig. 22;

Fig. 24 shows partially a variation in which the two surfaces that compress the element are fitted with circular transverse grooves;

Fig. 25 is a vertical cut of a suspension requiring two articulation and abutment devices comprising, each, several elastic masses which divide between themselves the forces to withstand.

Fig. 26 is a corresponding plan view;

Fig. 27 is a horizontal cut along the line 27—27 of Fig. 25;

Fig. 28 is a vertical cross-sectional view of an articulation and abutment device according to the invention and showing the elastomeric element of Figs. 13 and 14 being positioned therein.

Under the form of the device represented in Figs. 1 to 9, the invention is supposed to be applied to the fixation of the main leaf of a leaf spring A, to the end of the girder B of a chassis of an automotive vehicle.

In the end of this girder in the form of a U is fixed a male part 2 provided, on its upper part, with an appendix 3 in the form of a U, engaging into the U of the girder B, to which it is attached by a certain number of rivets 4. The part 2 comprises, on its lower portion, a bulge whose male surface 5 is in the shape of a spherical saucer, with a center situated at O.

In the pole of the surface 5, in the part 2, is provided a radial hole 6.

Laterally, above the spherical surface 5, the male part 2 comprises two flat lateral surfaces 7 against which are applied two side plates 8, maintained by a bolt 9 and prevented, each, from turning by two pins 10. These two side plates 8 are used to connect to the part 2 another metal part 11, maintained by a bolt 12 and the pins 13.

The part 11 comprises, on the top, a female surface 14, concentric to the surface 5, and, consequently, of the same center O. This surface 14 comprises, also, a central hole 15.

Between the two surfaces 5 and 14 is engaged the end 16 of the main leaf 1, this extremity having the shape of a spoon because its top surfaces 17 and bottom surfaces 18 are spherical and of the same center O as the preceding. The angle to the center $x$, underspread by the surface 17, is at least equal to 70° and at the maximum equal to 180° and, preferably, it is comprised between 90 and 120°.

The distance between the concentric surfaces 5 and 14 is greater than that between the surfaces 17 and 18, so as to provide chambers on each side of the spoon 16.

In the chamber of constant radial thickness, provided between the concentric surfaces 5 and 17, there is located a first elastic mass 19, of natural rubber or synthetic rubber or other elastomer, in the form of a cushion or disc and constituting, in combination with the part 2 and the extremity 16 of the spring, the device of articulation and abutment of this invention.

Likewise, in the other chamber provided between the surface 14 of the part 11 and the surface 18 of the extremity of the leaf, there is located a second elastic mass 20, analogous to the mass 19, of the same nature or not and forming, with the extremity of the leaf and the part 11, an antagonistic or reaction device R.

The cushions of elastic material 19 and 20 are shown in the free state at $19^a$ and $20^a$, respectively, in Figs. 4, 5 and 6, 7. They have, in plan, a circular form, which is an open shape, by contrast to a ring or sleeve and comprising the spherical surfaces respectively $5^a$ and $17^a$, $14^a$ and $18^a$, concentric two by two and intended to rest against the adjacent surfaces 5 and 17 or 14 and 18 of the metallic parts between which the cushions shall be located.

Each cushion is limited laterally, by a surface of revolution 21 or 22, preferably of conical shape and passing through the center $O^1$ or $O^2$, common to the surface $5^a$, $17^a$ or $14^a$, $18^a$.

The radial thickness $y^0$ or $z^0$ of each of these cushions is constant over all their length, with the exception that each of them comprises, on one of its spherical faces, a lug $6^a$ or $15^a$, intended to be introduced into the hole 6 or 15 of the adjacent rigid part 2 or 11.

In addition, the thickness $y^0$ or $z^0$ is superior to the radial thickness $y$ or $z$ of the previously cited chambers provided between the spoon 16 and the concentric spherical surfaces 5 and 14 when said spoon occupies the position shown in Fig. 1, in such a manner that after assembly of the two cushions, placed in this chamber, their radial thicknesses are now reduced in a uniform manner and since the elastomer used is not compressible, the reduction of volume which would result from the diminution of thickness is compensated by circumferential spreading around the center O and in all directions, starting from the line of the pole X—X (Fig. 3) passing through said center O.

During assembly, the cushions $21^a$ and $22^a$ are coated, on their spherical surfaces $5^a$, $17^a$, $14^a$, $18^a$, with a lubricant which will disappear later, and then the cushions are engaged by means of their lugs $6^a$ and $15^a$, in the holes 6 and 15 of the parts 2 and 11. After that, you proceed, by any means (one of the means will be described later) to bring these pieces closer and it will result, according to a well known technique, in the elastomeric masses sliding on the metallic surfaces between which they are pressed, without rolling on these surfaces, and sustaining elongation in all directions, that is to say, in all meridians, parallel to the surfaces between which these masses are compressed.

The result is that:

On the one hand, the imaginary radial lines, such as $cd$, $ef$ and $gh$ (Fig. 8) passing through the center $O^1$ of the elastic mass in the free state maintains, after deformation, in the radial directions $c^1d^1$, $e^1f^1$ and $g^1h^1$ (Fig. 9), the extreme lines $ab$ and $ij$ slightly curved in the shape of a small bulge as illustrated in Fig. 9 at $a^1b^1$ and $i^1j^1$; and that, on the other hand, the concentric lines to the center $O^1$, such as $kl$ and $mn$, remain concentric, as at $k^1l^1$ and $m^1n^1$. In other words, the curved rectangles such as those shaded in Fig. 8 remain curved rectangles such as the corresponding rectangle shaded in Fig. 9, these rectangles having reduced thickness and being spread circumferentially.

What is true for the plane of Figs. 8 and 9 is also true, obviously, for any radial plane passing through the line of the poles X—X.

From this deformation of the elastomeric masses results a great advantage. It is known, of course, that such a deformation assures a great rigidity in the radial direction; however, on the contrary, the elastic mass can sustain deformation in relatively great proportions in the circumferential direction, by reason that an imaginary radial line, shortened according to $e^1f^1$ (Fig. 9) tends, by itself through the circular displacement, for instance, in the direction of the arrow $F^1$ (Fig. 9), to return to a length $e^1f^2$ equal to the length of the free state $ef$.

Consequently, the described assembly assures a great rigidity between the spring A and the rest bar 2 of the chassis, submitted to the action of the weight P of the suspended part of the vehicle, this weight passing through the center O. But, on the contrary, there remain possible the important oscillations of the main leaf 1 and, consequently, of the spring A in all the circumferential directions passing through the center O and, particularly, in the longitudinal direction (Fig. 1) and in the transverse direction (Fig. 3).

The object of the antagonistic or reactor part R is to prevent a relaxation of the cushion 19 during the bump rebound of the vehicle or if, for some reason or another, the chassis may be lifted with respect to the train. In this case, the two side plates 8, retaining rigidly the part 11 or the part 2, prevent all excessive release not only of the mass 19 of the elastic articulation and abutment device D, but also of the elastic mass 20 of the reactor.

It will be noticed naturally that the oscillations of large amplitude around the center O are only possible, obviously, as long as the spherical surfaces present no protruding parts susceptible to abutment against the mass of the elastomer, as is shown clearly in the example.

Obviously, in the preceding example, the cushions $19^a$ and $20^a$ could be simplified, i.e., instead of having spherical contact surfaces, these contact surfaces could be flat.

The lug for centering and immobilization of each elastic mass can, obviously, be a separate part attached by some way or another. There can also be two lugs, in one piece or also attached on each mass to locate, preferably, the center of each of the contact surfaces against the adjacent part and preventing also all risk of displacement of the whole mass.

In Fig. 10 is shown a variation of the elastic mass 20, in which there are two centering lugs, constituted by two separate parts 23 and 23ª, each one formed in the shape of a forked elastic clip in metal (bronze or brass, for instance) or plastic material. These clips can be pressed slightly in the corresponding holes of the adjacent metallic part. These clips are, preferably, provided each with a base, such as at 24, attached on the elastic mass 20 by vulcanization or otherwise.

In the example of Figs. 1 to 9, all the mass of each elastic cushion 19 and 20 has sustained the same deformation, i.e., the same diminution of thickness, due to the lubrication of the surfaces of contact before the deformation of the elastic masses.

The invention can also be realized under another known technique, starting, as shown in Fig. 11, with masses of rubber 25 and 26, intended respectively for the elastic device $D^1$ and for the antagonistic device $R^1$, each of these masses not having, as in the preceding example, a constant radial thickness, but, on the contrary, variable radial thickness.

In fact, the mass 25 which comprises a spherical surface $5^b$ attached by bonding or vulcanization against the spherical surface 5 at center O of the part 2, comprises on the opposite surface $17^b$ a central bulge 27, while it is extended over all its outer surface by a thin flash $27^a$, also bonded or vulcanized, and intended, as known in the trade, to prevent any risk of tearing of the mass 25.

During the pressing, which can be effected with or without a lubricant, the elastic mass can no longer slide over the surface 5 of the part 2 but sustains internal deformations which diminish the radial thickness in the middle of bulge 27 and increase its thickness on the periphery of that bulge, the mass 25, when pressed in its final position, having a constant thickness, the surface $17^b$ having taken the shape indicated in the dot-dash line 28 which corresponds to a spherical surface concentric to the axis O, the central portion in excess of that mass having now filled the peripheral parts. The thin flash type portion 27 is not affected by that pressing.

With such an assembly, the rubber cushion is, obviously, more radially compressed in the central portion near its pole than in the peripheral portion but a result similar to the one of the first example is obtained as far as rigid abutment is concerned and also as to the possibility of oscillation of the spoon 16 with regard to the part 2 around the center O.

Also, the mass 26, if it comprises a convex spherical surface $14^b$ intended to be bonded or vulcanized to the spherical surface 14 of the rigid part 11 of the reactor, comprises, by contrast, on its upper face, a central bulge 29 which, during the spreading, will furnish the elastic material which moves by internal deformation toward the periphery of the mass to give to the latter a constant thickness. The final internal surface of the said mass, after compression, will be represented by the dot-dash line 30, which corresponds to a spherical surface concentric to the center O.

As in the first example, no lateral abutment will prevent the oscillation around the center O.

Fig. 12 shows an alternate form of the same type, but in which each elastic mass 31 and 32 of the devices $D^2$ and $R^2$ comprises a number of grooves made by bulges 33 and 34 and by depressions 35 and 36 alternately, which depressions will be filled at the expense of the bulges during the radial flattening.

Under another method of realization shown in Figs. 13 and 14, the elastomeric element is constituted, in the free state, by a ball $20^c$ in the shape of a perfect sphere or of a sphere more or less flattened. It bears at least one lug, or, preferably, and as shown, two lugs $23^b$ and $23^c$, diametrically opposite, intended to lock the poles of the ball with the concentric surfaces between which it will be compressed. Fig. 28 shows an elastomeric layer $20^c$ of Figs. 13 and 14 being positioned within an articulation similar to that disclosed in Fig. 3 except that end $16^x$ of the main leaf of the spring is provided with a central hole for accommodation of the lug $23^c$.

Under this alternative, the use of a lubricant during the assembly may be avoided; the elastomeric element is flattened between the spherical rigid concentric surfaces between which it is placed.

While this device of articulation and abutment under the first example presents a great axial rigidity and possesses an aptitude to support great axial loads, on the other hand the one utilizing an elastomeric mass of a more or less spherical conformation possesses these two qualities only to a lesser degree but, in compensation, is remarkably flexible in directions concentric to the center, without the possibility that the elastic mass could leave its medium intended position in the assembly due to the anchorage of one or the other of its two poles to one or two concentric surfaces.

In the preceding examples, center O of the spherical surfaces, which are either the ones of the articulation and abutment devices D, $D^1$ or $D^2$ or the spherical surfaces of the antagonistic devices R, $R^1$ or $R^2$, is situated on the opposite side of the antagonistic or reactor device in relation with the device of articulation and abutment, but this arrangement need not always be the case. In Figs. 15 and 16 there is shown a form of the invention in which center $O^4$ is situated between the device of articulation and abutment $D^4$ and the reactor device $R^4$. Such application may be utilized for the ball joint in the lower end of the tubular body 37 of a telescopic shock absorber.

This body comprises two diametrically opposite openings 38 and, a little above this opening, an internal shoulder 39, made by a limited constraining or annular crimp. Against this shoulder there rests, by means of flange 40, a saucer 41 in the shape of a spherical cap with a center $O^4$. This saucer cap is provided with a central hole 42 permitting the centering of an elastic mass 43, compressed radially between said saucer and a concentric spherical cap 44 which forms, with a diametrically opposite cap 45, the body of a metal ball, intended to be traversed by an axis 46, shown in dot-dash line and intended to fix the shock absorber on the non-suspended part of a vehicle. It will be understood that the body 37 may be fixed to the suspended part, or inversely, that the assembly 44—45 is or could be mounted rigidly on the axis 46, the elastomeric cushion permitting, due to the absence of any lateral abutment, all the necessary movement by molecular deformation in the elastomer itself.

The cap 45 constitutes the internal surface of the reaction device $R^4$ which, besides that cap, comprises the radially deformed elastic mass 47 and an externally positioned saucer 48, itself attached by a mounting in 49 in the extremity of the tubular body 37.

The elastic masses 43 and 47 can be of the type in the first example or one of the following types.

The two caps or half shells 44 and 45 are, obviously, attached one to the other, as, for instance, by welding along their contact lines 50. These half shells can each be obtained by stamping of a strip.

As a non-restrictive example, Figs. 17 and 18 show an apparatus allowing the mounting of the ball device of Figs. 15 and 16. This apparatus comprises two supports 51 and 52. In the support 52 there oscillates, around a horizontal axis 53, a sliding bar 54 in which is inserted the assembly made by the two half shells 44 and 45 previously joined through their contact lines 50.

As can be seen, the small oscillations of the bar 54 around the axis 53 results in practically no displacement in the translation of the ball (44, 45) in the vertical plane; the arc Y—Y, with a center situated on the axis 53, could be confused with its tangent due to the fact that the angle of oscillation will always be very small.

The support 52 has the shape of a U, the lower part comprising a cylinder 52a in which can slide a sleeve 55 in which slides, in its turn, the punch 56 of a press. The sleeve 55 is pushed back upward by the light spring 57 resting on a shoulder of the punch 56.

In a chamber 56a of this punch is a movable plunger 58 that a spring 59 tends to maintain against a shoulder 60, provided on the top face 61 of the punch. A longitudinal clearance $v$, large enough to receive the mounting, as will be seen later, is then provided between the lower face of the plunger 68 and bottom of the chamber 56a. The flange 61 of the punch comprises, on its upper face, a slot 62 intended to form the mounting of the lower end of the tubular body 37 of the shock absorber, whereas the plunger 56 comprises a head 63 with a concave spherical upper surface 64, of the same radius as the saucer 48.

The upper part of the support 52 carries an abutment part 65 on which can be situated the upper end of the tube 36.

The method of operation is as follows. To the free end of the body 37 is attached the upper cap 41 provided with its mass 43a (Fig. 17) of rubber in the free state (compare its radial dimension to that of the same mass 42 compressed in Fig. 15). This mass 43a holds to the cap 41 by its central lug.

There is then introduced in the openings 38 of the body 37, the assembly made by the two half shells 44 and 45, united by their lips 50, whereas the lower saucer 48 with its rubber mass still undeformed 47a is placed on the top end 63 of the plunger 58.

The body 37 of the shock absorber with its saucer 41, the mass 43a and the ball (44, 45) is engaged first by its upper end on the upper part of the abutment 65, then in the guide 55 previously lowered by hand action on this guide, against the action of the spring 57.

The punch 56, which is in the lower position during the placement of the part, is then raised progressively. The plunger 58 comes soon to rest against the saucer 64, whereas this plunger is maintained at rest against the shoulder 61 by the strong spring 59.

In continuing to raise the punch 56, the plunger 58, maintained by a sufficiently powerful, non-flexing spring 59, creates a pressure on the mass 47a of the rubber which, in its turn, by the medium of the ball (44—45) transmits the same pressure to the upper mass 43a. Consequently, there is a progressive and simultaneous compression of the two masses 42a and 47a.

The movement continues until the desired compression of the rubber masses has been obtained. During the movement, the spring 59, which has been designed accordingly, has not flexed in such a way that, at the end of the compression of the rubber, the plunger 56 has come to rest, by its groove 62, under the lower face of the body 37, whereas the clearance $v$ has been maintained.

In pursuing the displacement toward the top of the punch 56, the plunger 58 moves practically no more due to the compression of the rubber and the punch 56, which, itself, continues its stroke to the clearance $v$, sets as at 47 (Fig. 13) the lower face of the body 37 on the flange of the saucer 48.

In all the preceding examples, the contact surfaces of the rubber masses with the metal parts between which they are applied are spherical surfaces of the same center, without lateral abutments, but the invention applies also to the case of cylindrical surfaces, frusto-conical or similar, of the same axis and also with lateral stops between themselves or between one or more elastic masses.

One application of this variation to the suspension of the bodies of railroad cars is represented in Figs. 19 to 23 and it concerns the articulation on the girder 67 of a bogie of a connecting rod 68 belonging to the classic pendular system, this device comprising, instead of a reaction device with elastic mass of the preceding examples, an antagonistic device constituted purely and simply by a rigid locking device.

One should refer particularly to Figs. 20 and 21 which show the device of articulation and support of the connecting rod 68 on the support 67a which is part of the girder 67. This support comprises a channel of prismatic form 69, with oblique faces, of inverted obliquities, forming a V in which rests, by two corresponding male surfaces 70, a cradle 71 whose upper face 72 is cylindrical and with an axis Z—Z. This cradle 71 is maintained longitudinally in the channel 69 by two abutment screws 73.

Above the cradle is disposed a supporting part 74 whose top face, of prismatic form and in V 75, is covered with a cap fitted with a complementary channel 65 of the connecting rod 68. This part 74 comprises, oriented downward, a male surface 77, also cylindrical and concentric to the surface 72, the two surfaces having the same axis Z—Z. Between these surfaces is compressed a cushion 78 of rubber or other elastomer, represented in its free state in Figs. 22 and 23.

This cushion is constituted by a sort of bar comprising two longitudinal cylindrical surfaces $77^a$ and $72^a$ concentric with an axis $Z^1$—$Z^1$, and separated by a radial thickness $z^o$ greater than the thickness $z$ presented by the mass 78 in place between the two surfaces 72 and 77.

The deformation of this rubber mass is such that its imaginary lines such as $op$ (Fig. 23) passing through the axis $Z^1$—$Z^1$ remain about radial but diminish in length, whereas its imaginary longitudinal lines such as $qr$ increase slightly in length in remaining parallel to themselves and the imaginary circumferential lines such as $st$ remain about parallel to themselves but elongate notably (compare Figs. 20 and 23, taking into account the difference of scales, the one of Fig. 23 being about double that of Fig. 20). These deformations take place in the presence of a temporary lubricant, as in the case of the forms illustrated in Figs. 1 to 8.

In order to avoid that, in case of raising, the rubber mass 78 becomes decompressed and returns totally or partly to its initial shape, there is provided an antagonistic device constituted by two pins 79, each engaged in the interior of two braces 80, which are part of the lateral extensions of the cradle 71. Each of these pins comprises, in its middle, a projection 81, which, after the assembly, will be slightly over a lateral resting surface 82, provided on the two side extensions of the part 74, which, in longitudinal cut (Fig. 21) has the form of a T.

It will be noted that the relative displacement toward the top of the part 74 in relation to the part 71, under the action of a partial decompression of the elastic mass 78, will be limited to the very small clearance $u$, provided in the design and which after the assembly exists between the projection 81 and the pin 79 and the corresponding resting surface 82.

Naturally the two pins are only put in place after the initial compression of the rubber 78.

The hereinabove example is not restrictive. The invention extends to any antagonistic device which limits the raising or the separation in the radial direction of the two rigid parts which encompass the elastic cushion supporting the load, together with not interfering when the load is applied so that the two parts, the supporting part and the supported part, oscillate in relation to each other. The antagonistic devices present, in all cases, a clearance $u$ of such dimensions that the articulations when loaded oscillate as if these devices did not exist but at the time of excessive reduction of radial load or, obviously, in the case of its suppression, the antagonistic device prevents the deformed cushion from taking or resuming totally or in part its initial shape and in doing so destroying the articulation. Consequently, the clearance $u$ will be chosen judiciously; if it is too small, the spaced elements will come in contact needlessly due to load variations of a minor nature that do not allow the elastomer to resume its free state form, and, if it is too large, it will not fulfill its role of preventing the return to the free state of the elastic mass.

Fig. 24 shows a partial variation of the previous example, in which the cradle $71^a$ and the resting part $74^a$ comprise, instead of cylindrical surfaces with straight generatrices 72 and 75 of the preceding example, the surfaces $72^a$ and $77^a$ of revolution around the axis Z—Z, but with generatrices constituted by undulated lines, with which variation, under a known technique, is avoided an elongation along these generatrices of the mass $78^b$ of rubber or other elastomer, the elongation during the closing toward one or another of the parts $71^a$ and $74^a$ being limited to a circumferential elongation intended to compensate, by the increase of the surfaces, the reduction of thickness, so that the non-compressible volume remains constant.

In that case, the device is practically rigid parallel to the axis of the surfaces of revolution $72^a$ and $77^a$ and keeps all its elastic flexibility in the direction of the oscillation around said axis, because in that direction there is provided no abutment whatever susceptible to limiting the oscillations whose amplitude is simply limited by the possibility of internal deformation of the mass $78^b$.

In all the methods of execution shown until now, there is provided either for the device of articulation and abutment itself or for the antagonistic device of Figs. 1 to 9, 11, 12 and 15–16 only one mass of elastomer, but, obviously, if the load to carry is such that a single mass will not suffice, there can be provided for either one or the other of these devices several masses in parallel, all the surfaces between which these masses are deformed being concentric around the same center or of the same axis.

In Figs. 25 to 27, there is shown a method of realization of two devices M and N with several masses, each intended to assure the pendular suspension of a part 83 of a machine or installation to another fixed part 84.

The device M comprises two supporting saucers 84 and 85 and two supported saucers 87 and 88, with male and female surfaces of the same center $O^5$. The supported saucers rest on the supporting saucers through the medium of two elastomeric masses 89 and 90, whereas a third mass 92 is interposed between the saucers 84 and 88.

The assemblies (84, 89, 87) and (85, 90, 88) constitute two elastic devices of articulation and abutment in parallel, whereas the assembly (88, 92, 84) constitutes the reaction device which comprises only one elastic mass.

The supporting saucers 84 and 85 are connected one with the other by parallel rods 93, pins at 94, 95 in the peripheral extensions 96, 97 of these saucers. There are, for example, three extensions at 180° from each other on each of these saucers and the extensions 96 of the saucer 84, longer than those of the saucer 85, rest in a seat 97 provided on the outer periphery of the top edge of a hole 98 provided in the fixed part 84 to receive the device M.

The supported saucers 87 and 88 are also provided with peripheral extensions 99 and 100, angularly alternated in relation to those of the supporting saucers and going through and keyed at 101, 102 to rods 103.

These rods 103, of adjustable length with the help of sleeves 104, connect the top device M to the lower device N.

This comprises: two supporting saucers 105 and 106 that with extensions 107 and 108 connect by pins 109 and 110 to the rods 103; two supported saucers 111, 112, connected together by the extensions 114, 115, with the pins 116, 117 and with the rods 118; two deformed elastic masses of articulation and support 119 and 120; and a deformed reactor elastomer mass 121.

The extensions 115 are longer than those of the other saucers and are engaged in a seat 122, provided on the periphery on the lower edge of an aperture 123 made in the supported part 83 to receive with clearance the device N.

The various spherical surfaces of this device N have the same center $O^6$.

The mechanical realization which has just been described has been chosen because it shows in a manner relatively simple the scope of the invention, but, obviously, in practice, the elements could be realized in another more rational manner.

However, in general, the invention is not at all limited to the methods of realization represented and described, which have only been chosen as an example.

Thus, there can be made in the form of one single part the two supported parts and the element of reaction of the examples of Figs. 1 to 3, 11 and 12 or even the analogous parts 37, 41 and 48 of the example of Fig. 15 on condition that this unique part provides, before assembly, an opening and a chamber sufficient to allow the placing of the elastomeric masses 19 and 20, 25, 26; 31, 32; 43, 47 not deformed and of the part 16 or (44, 45) separating them, the compression and spreading of the said masses being obtained by a permanent deformation of that unique part obtained by either cold forging, forming or otherwise.

In the example of Fig. 15, the ball joint (44, 45) could be replaced by a spoon similar to that of Figs. 1, 2, 5 or 11 or 12, the center being then situated on the side of the concave surface of said spoon, the concavity being able to be oriented toward the top or toward the bottom, at will.

Also, in the example of Figs. 11 and 12, the elastomeric masses could comprise one or several bulges on each of their faces.

In the example of Figs. 19 to 23, the rigid parts 71 and 74 could be formed by the portions of tubular pieces with parallel inner and outer surfaces. In this case, the reactor means could be arranged either along the free longitudinal edge of these parts, or on their transverse edges, in the form of mutual abutments of support presenting, in the assembled position, the suitable clearance analogous to the one $u$ of Fig. 21.

Such assembly with cylindrical surfaces and with parts constituted by the portions of tubes could be utilized especially to cover the top portion of gear boxes in locomotives and to be covered themselves by balancers which would allow reduction in size and considerable simplification of conventional gear box arrangements.

In the example of Figs. 25 to 27 there is provided for each device M and N only one mass of elastomer 92 or 121, because one single mass will generally be sufficient. This mass could also have smaller surfaces than those of the other masses 89, 90 or 119, 120 because it has for its object the prevention of the return to the free state in an excessive proportion, and this especially in the case of assemblies which seldom have to function in oscillation, and then only during short periods of time, under small loads or no load at all.

Besides, in the device of Figs. 25 to 27, the reaction elastomer could be suppressed and replaced by a simple clearance of reduced dimension between the metallic faces adjacent to this elastomer of reaction and belonging to parts 84, 88 and 108, 112 so that when the load to which the suspension device is submitted is not reduced in an excessive proportion, a clearance exists between these surfaces, this clearance disappearing and the surfaces coming into contact, metal to metal, only if the load reduction becomes excessive.

In the case where this excessive reduction of the load is accomplished by a cessation of the oscillations, there is no need to worry about the risk of friction between the metallic surfaces which are still then one in relation with the other. If the oscillations, generally reduced and of short duration, should be considered, the corresponding rubbing surfaces can be provided with washers of fiber or graphite, etc.

Finally, the absence of any abutment on the concentric surfaces of such a nature as to prevent oscillation was already emphasized above several times. It remains understood, however, that there can be provided security stops intended to prevent any amplification of the oscillation by resonance or other cause, but these stops should, in this case, be established so as not to impair normal oscillation.

I claim:

1. An oscillatory joint adapted to support resiliently loads which may oscillate at least about an axis by means of an elastomer member comprising at least two rigid bearing members presenting when assembled in opposed relationship to each other a convex bearing surface and a concave bearing surface, the said surfaces being, in operative conformation, substantially concentric about at least one axis around which the two bearing members are intended to oscillate, and having interposed between said surfaces an elastomer layer deformed in the direction of the load prior to application of said load and adapted to be the main load-supporting element in said joint, said layer being radially compressed and circumferentially expanded about said one axis at least, an elastomer reactor layer under a compression substantially similar to that of the load supporting elastomer layer to limit the reduction of the said deformation of the elastomer in the axial direction of the load to be supported, said reactor layer being supported on another rigid bearing member, one of said at least two rigid bearing members being disposed between said rigid reactor layer supporting bearing member and the other of said at least two rigid bearing members, said other of said at least two rigid bearing members and said rigid reactor layer supporting bearing member being fixedly spaced from one another when assembled, and locator lugs on said elastomer layers engaged with the bearing surfaces adjacent thereto, both said elastomer layers being free to expand and contract circumferentially about said one axis under varying loads without substantial interference from said rigid bearing members.

2. The oscillatory joint defined in claim 1, in which the said deformation of the elastomer will create spreading of said elastomer along both the concave and convex surfaces so as to increase the radial bearing surface dimensions of the said elastomer in the assembled state as compared to the free state.

3. The invention as defined in claim 1 having the additional characteristic that the rigid bearing surfaces are portions of concentric spheres.

4. The invention as defined in claim 1 having the additional characteristic that the rigid bearing surfaces are portions of cylindrical channels.

5. The oscillatory joint defined in claim 1 being further characterized by the fact that the elastomer reactor layer has a total bearing area thereof constituting only a fractional part of the total bearing area of the supporting elastomer layer.

6. The invention as defined in claim 1 in which said joint is provided with a plurality of supporting layers and a plurality of reactor layers operative in parallel to support the load.

7. The invention as described in claim 1 in which the elastomer reactor layer is on the same side of a common center with the said elastomer supporting layer.

8. The invention as defined in claim 1 in which the elastomer reactor layer is on the side of the center opposite that on which is the said supporting elastomer layer.

9. The invention as defined in claim 1 in which the elastomer layer is further characterized by being in its free state prior to assembly in the said joint in the form of a substantial sphere, having locator lugs at each pole.

References Cited in the file of this patent

UNITED STATES PATENTS

| | | |
|---|---|---|
| 1,789,725 | Chilton | Jan. 20, 1931 |
| 1,806,569 | Anibal | May 19, 1931 |
| 1,825,352 | Jansson | Sept. 29, 1931 |
| 1,892,065 | Markey | Dec. 27, 1932 |
| 2,044,392 | Lord | June 16, 1936 |
| 2,196,702 | Leighton | Apr. 9, 1940 |
| 2,831,674 | Brown et al. | Apr. 22, 1958 |

FOREIGN PATENTS

| | | |
|---|---|---|
| 839,378 | France | Jan. 4, 1939 |
| 590,537 | Great Britain | July 21, 1947 |